Jan. 19, 1954 J. W. DAVIS 2,666,846

ANTENNA NETWORK

Filed July 8, 1950

INVENTOR.
JOHN W. DAVIS
BY Lyon & Lyon
ATTORNEYS

Patented Jan. 19, 1954 2,666,846

UNITED STATES PATENT OFFICE 2,666,846

ANTENNA NETWORK

John W. Davis, Lawndale, Calif., assignor to Richard Lane and Robert S. Groman, doing business as Television Accessories, Los Angeles, Calif., a copartnership Application July 8, 1950, Serial No. 172,728

4 Claims. (Cl. 250—16)

This invention relates to antenna networks and more particularly to antenna networks which are useful at relatively high frequencies such as those employed for present day commercial television and frequency modulation transmissions.

Numerous types of receiving antennas have been designed and are in common use for television and frequency modulation receivers. Particularly for television receivers, a difficult problem in antenna design is presented due to the relatively large range of frequencies to which the antenna must respond. Those receiving antennas currently in use which give satisfactory performance have several undesirable features. The majority are large and bulky and are intended for installation upon the roof of the building in which the television receiver is to be used. Such antennas are not only unsightly, but are rather difficult and expensive to install. Further, in certain types of buildings, for example, apartment houses, limited roof space makes such antennas altogether unsuitable. In order to replace such large outdoor television antennas, a number of different types of so-called "indoor" and "built-in" antennas have been designed. It has been found, however, that the performance of such antennas is, in general, unsatisfactory. The "indoor antennas" not only provide a rather low response, but are also unsightly in appearance. The "built-in antennas," while presenting no problem from the appearance standpoint, have been found to give very poor response. In accordance with the present invention, each of these difficulties is overcome.

Accordingly, it is a principal object of this invention to provide an antenna network for commercial television or frequency modulation receivers which is rather small in size and which will give a satisfactory response over the desired frequency.

It is a further object of this invention to provide such a network which can be located either immediately adjacent to or inside the cabinet of the receiver.

It is an additional object of this invention to provide such a network which is exceedingly simple to operate, inexpensive to manufacture, and simple to install.

Other objects and advantages of the invention will be apparent during the course of the following description.

In the accompanying drawings, forming a part of this specification, and in which like numerals are employed to designate like parts throughout the same:

Figure 1:
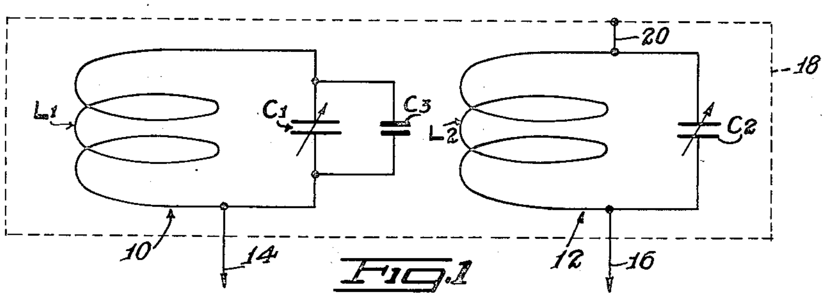
Fig. 1 is a circuit diagram of an antenna network for a television receiver constructed in accordance with the present invention.

Referring first to Fig. 1, the antenna circuit of the present invention is shown to consist of a pair of parallel circuits 10 and 12. The circuit 10 comprises a coil $L_1$ which is shunted by a variable condenser $C_1$. The variable condenser $C_1$ is in turn shunted by a fixed condenser $C_3$. The parallel circuit 12 consists of a coil $L_2$ shunted by a variable condenser $C_2$. Leads 14 and 16 attached to the two parallel circuits respectively, lead to the normal antenna input circuit to a television receiver. Such antenna input circuit comprises, for example, the ungrounded terminals of a primary winding of the transformer. A metallic shield box 18 is employed, which is closed at its top and bottom and at two sides, but open at its remaining two sides. As seen, shield box 18 is connected to the circuit 12 by the conductor 20.

While it has been found that the values of the various circuit parameters are not critical, within reasonable limits, tests have disclosed that the following values result in best response when the network is used as a television antenna.

The coils $L_1$ and $L_2$ are each constructed of two turns of wire, and are approximately 4 inches in diameter, the turns of each coil being relatively closely spaced. The variable condensers $C_1$ and $C_2$ are each of the air dielectric type and have a maximum capacity value of 50 micromicrofarads. The condenser $C_3$ has a value of 500 micromicrofarads.

Figure 2:
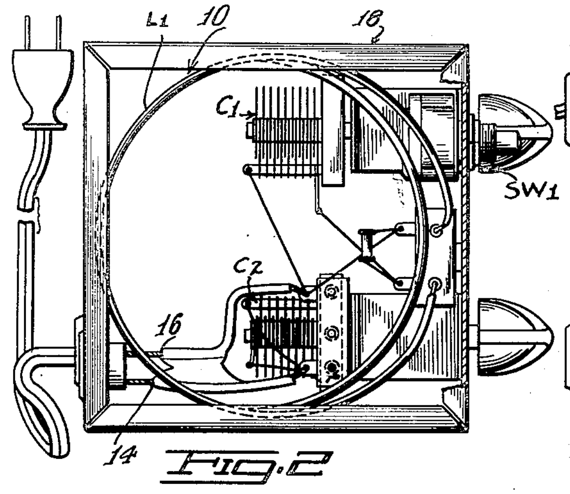
Fig. 2 is a plan view illustrating the physical location of the various elements in the network shown in Fig. 1.
Figure 3:
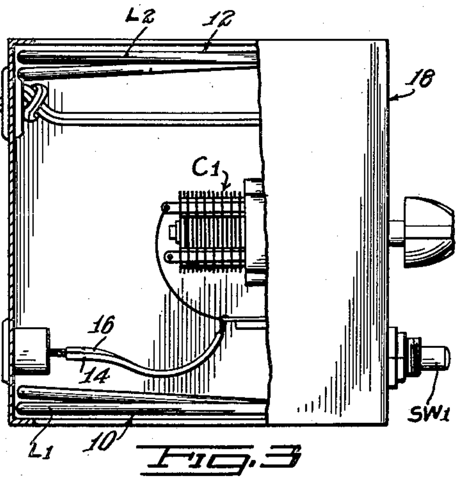
Fig. 3 is a side view to that of Fig. 2.

The shield box 18 which is constructed of any suitable conducting metal is made but slightly larger than the diameter of the coils $L_1$. As seen in Figs. 2 and 3, the coils $L_1$ are located at opposite sides of the shield 18, adjacent the open ends of the shield, spaced from each other about 3½ inches. Further, the variable condensers $C_1$ and $C_2$ are located adjacent each other and substantially midway between the two coils. The coils are parallel to each other with the result that there will be some mutual inductance between them.

It is of course to be understood that the above values represent merely the orders of magnitude which must be employed, and that they may be varied over a considerable range. Tests have demonstrated, however, that the coils $L_1$ and $L_2$ must be made relatively large and of but a very few number of turns.

In order to operate the antenna circuit shown in Figs. 1 through 3, the leads 14 and 16 are connected to the conventional input circuits on a television receiver, and the network is located either inside or adjacent the television receiver cabinet. If desired, the entire network, including the shield box 18, may be placed in an attractive plastic or wood case without affecting its operation. The receiver is then tuned to a particular channel following which the antenna circuit is tuned by means of the variable condensers $C_1$ and $C_2$. It has been found that if the television receiver is tuned to one of the channels at the higher frequency end of the present commercial television band, the position of the condenser $C_2$ will have but little effect on the response of the circuit. On the other hand, at these frequencies, the tuning of the condenser $C_1$ will have a very marked influence on the response of the circuit. By tuning the condenser $C_1$ to the position of maximum response, as indicated either by the appearance of the image on the television screen or the intensity of the received audio signal, maximum antenna response and with it optimum reception will result. At the lower end of the television band, that is, when the television receiver is tuned to the lower channels, just the opposite will occur. Thus, the condenser $C_2$ will in general control the response of the antenna circuit, while the tuning of the condenser $C_1$ will have little effect. At the middle range of frequencies, it has been found that the response of the circuit will be approximately equally affected by each of the two tuning condensers. Thus, when channels in middle frequency range are tuned in, it is desirable to tune each of the variable condensers, $C_1$ and $C_2$ for maximum response.

Figure 4:
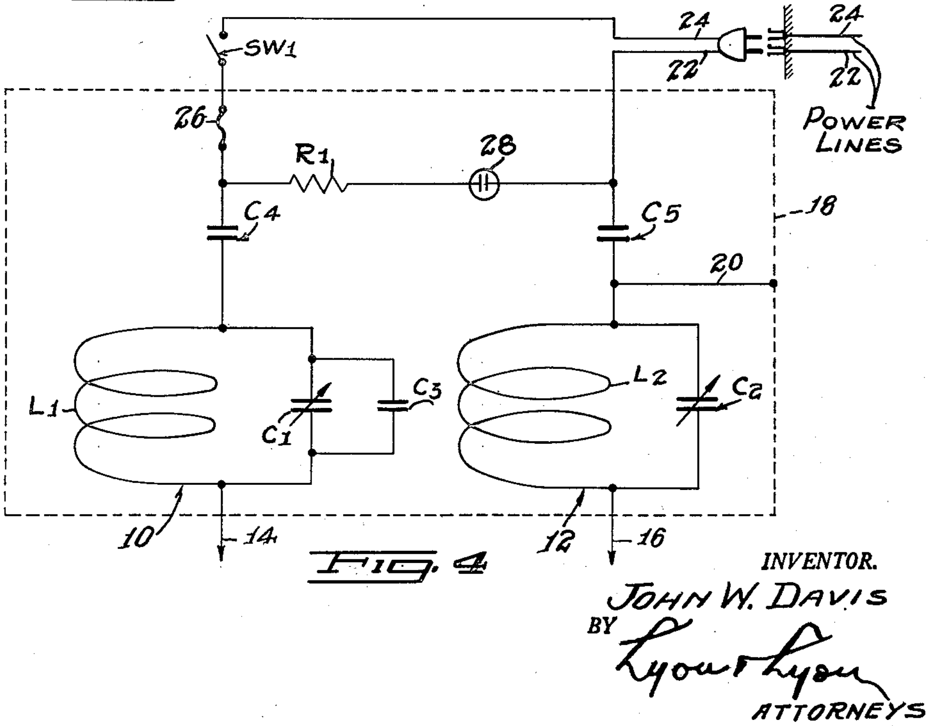
Fig. 4 is a circuit diagram of a modification of he circuit shown in Fig. 1.

In Fig. 4 is illustrated a modification of the antenna circuit shown in Figs. 1 through 3. Thus, in addition to the parallel circuits 10 and 12 and the shielding box 18, which are identical to those illustrated in Figs. 1 through 3, there is provided a pair of leads 22 and 24 which leads are connected directly to the 110 volt 60 cycle household power source by means of a conventional type two-prong male plug. A pair of blocking condensers $C_4$ and $C_5$, a fuse 26 and a switch $SW_1$ are also employed. The blocking condensers which may be of any suitable value, for example, .00005 microfarad, are provided to prevent the passage of 60 cycle current into the television receiver. In addition, bridging the connectors 22 and 24 are a resistor $R_1$ and a small neon glow tube 28. The neon glow tube is provided merely as an indicator to show that the circuit is connected to the power source and that the switch $SW_1$ is closed. It has no other relation to the antenna circuit. The resistor $R_1$, which may be of the order of 180,000 ohms is utilized simply as a dropping resistor to protect the neon glow tube.

The modified circuit shown in Fig. 4 has been found to have certain advantages over the simple circuit disclosed in Figs. 1 through 3. Thus, it has been found that a greatly improved response is realized with the latter circuit in certain types of buildings. This improved response is believed to result from the utilization of the normal power electrical winding throughout the building as a source of the desired signals. It has been found, however, that in certain types of structures, particularly steel frame buildings, the response of the antenna circuit shown in Fig. 4 is considerably inferior to that shown in Figs. 1 through 3. This result is believed to be caused by the fact that not only will the steel structure prevent the electrical power winding from picking up the desired radio waves, but also dissipation of a portion of the radio energy picked up by the remaining parts of the antenna network through such power wires probably occurs. It is of course obvious that by simply disconnecting the leads 22 and 24 from the power wires, the circuit of Figs. 1 through 3 will result. The glow tube 28 and the resistor $R_1$ form no part of the antenna circuit, but are included merely to provide an indicating means to show whether the switch $SW_1$ is closed. If the switch $SW_1$ is maintained open when the circuit is not in use, the life of the blocking condensers $C_4$ and $C_5$ will be prolonged.

While the present invention has been described as an antenna for television receivers, it is to be understood that its application is not so limited and that it can be employed satisfactorily as an antenna for other high frequency reception such, for example, as present commercial frequency modulation.

It is to be understood that the forms of the invention herewith shown and described are to be taken as preferred examples of the same, and that various changes in the shape, size and arrangement of parts may be resorted to without departing from the spirit of the invention or the scope of the appended claims.

Having thus described the invention, I claim:

1. An antenna network comprising a first circuit including a connector adapted to be connected to one terminal of a household alternating current power source, a blocking condenser connected thereto, a first coil having one of its terminals connected to the said blocking condenser, a variable condenser connected across the said coil and a fixed condenser connected across the said variable condenser; a second circuit including a second connector adapted to be connected to the other terminal of said household alternating current power source, a second blocking condenser connected thereto, a second coil having one of its terminals connected to the said second blocking condenser and a second variable condenser connected across the said second coil, the other terminals of said first coil and said second coil being connectable respectively to opposite terminals of the input circuit of a receiver.

2. An antenna network in accordance with claim 1 wherein the said coils consist of two 4 inch diameter turns of wire and the said variable condensers have a maximum capacity of 50 micromicrofarads.

3. An antenna network comprising an open-ended metallic box, a coil located adjacent and parallel to one of the open ends of the said box, a connector adapted to be connected to a household alternating current power source, a blocking condenser connected between the said connector and the said coil, a variable condenser connected across the said coil and a fixed condenser connected across the said variable condenser; a second coil located adjacent and parallel to the other open end of the said box, a second connector adapted to be connected to a household alternating current power source, a second blocking condenser connected between the said second connector and the said second coil, a second variable condenser connected across the second coil and an electrical connection between the said second coil and the said box.

4. An antenna network in accordance with claim 3 wherein the said coils consist of two 4 inch diameter turns of wire and the said variable condensers have a maximum capacity of 50 micromicrofarads.

JOHN W. DAVIS.

References Cited in the file of this patent

UNITED STATES PATENTS

| Number | Name | Date |
|---|---|---|
| 2,130,824 | Jones et al. | Sept. 20, 1938 |
| 2,520,811 | Reid | Aug. 29, 1950 |
| 2,538,525 | Kaltenbacher | Jan. 16, 1951 |
| 2,562,654 | Williams | July 31, 1951 |
| 2,581,983 | Thompson | Jan. 8, 1952 |

FOREIGN PATENTS

| Number | Country | Date |
|---|---|---|
| 927,866 | France | Nov. 12, 1947 |